US010033267B2

(12) United States Patent
Rinne et al.

(10) Patent No.: US 10,033,267 B2
(45) Date of Patent: Jul. 24, 2018

(54) DIGITAL STRESS SHARING CONTROL LOOPS FOR POINT OF LOAD CONVERTERS

(71) Applicant: Rohm Powervation Limited, Blackrock, Cork (IE)

(72) Inventors: Karl Rinne, Cork (IE); Basil Almukhtar, Limerick (IE); Elaine Sheridan, Cork (IE)

(73) Assignee: ROHM POWERVATION LIMITED, Blackrock, Cork (IE)

( * ) Notice: Subject to any disclaimer, the term of this patent is extended or adjusted under 35 U.S.C. 154(b) by 0 days.

(21) Appl. No.: 14/903,698

(22) PCT Filed: Jul. 7, 2014

(86) PCT No.: PCT/EP2014/064490
§ 371 (c)(1),
(2) Date: Jan. 8, 2016

(87) PCT Pub. No.: WO2015/004077
PCT Pub. Date: Jan. 15, 2015

(65) Prior Publication Data
US 2016/0164400 A1  Jun. 9, 2016

(30) Foreign Application Priority Data

Jul. 8, 2013  (GB) .................................. 1312202.3

(51) Int. Cl.
*H02M 3/157* (2006.01)
*H02M 3/04* (2006.01)
(Continued)

(52) U.S. Cl.
CPC ............. *H02M 3/04* (2013.01); *H02M 3/157* (2013.01); *H02M 3/1584* (2013.01);
(Continued)

(58) Field of Classification Search
CPC ... H02M 2001/0012; H02M 2001/008; H02M 2001/0025; H02M 3/157; H02M 3/04; H02M 3/1584; H02M 3/285
See application file for complete search history.

(56) References Cited

U.S. PATENT DOCUMENTS 9,748,830 B1 *  8/2017  Soleno ................ H02M 3/1584
2011/0031940 A1 *  2/2011  Green ................. H02M 1/4208
323/205

(Continued)

FOREIGN PATENT DOCUMENTS

DE  2355756 A1 *  5/1975  ............. G05B 11/42
DE  2355756 A1     5/1975
(Continued)

OTHER PUBLICATIONS

International Bureau, "International Preliminary Report", in application No. PCT/EP2014/064490, dated Jan. 21, 2016, 11 pages.
(Continued)

*Primary Examiner* — Jue Zhang
*Assistant Examiner* — Jye-June Lee
(74) *Attorney, Agent, or Firm* — Hickman Palermo Becker Bingham LLP; Edward A. Becker

(57) ABSTRACT

The present application relates to power converters, particularly switch mode power converters sharing a load in which the converters are operated to share stresses between them. The application provides a controller (108) in which a stress share control loop (108a, 108b) is provided to ensure the associated converter is operating at an average stress. The stress share control loop has a proportional and an integral term in its feedback path. The integral term may be enabled or disabled. In use, the integral term is enabled in all but one controller.

20 Claims, 6 Drawing Sheets

(51) Int. Cl.
*H02M 3/158* (2006.01)
*H02M 1/00* (2006.01)
*H02M 3/28* (2006.01)

(52) U.S. Cl.
CPC ...... *H02M 3/285* (2013.01); *H02M 2001/008* (2013.01); *H02M 2001/0012* (2013.01); *H02M 2001/0025* (2013.01)

(56) References Cited

U.S. PATENT DOCUMENTS

| | | | | |
|---|---|---|---|---|
| 2012/0163429 | A1* | 6/2012 | Rinne | H02M 3/157 375/219 |
| 2012/0170639 | A1* | 7/2012 | Salsbury | G05B 13/048 375/233 |
| 2014/0339902 | A1* | 11/2014 | Sepe, Jr. | H02J 1/102 307/80 |

FOREIGN PATENT DOCUMENTS

| | | |
|---|---|---|
| EP | 1 223 483 A1 | 7/2002 |
| EP | 1223483 A1 * | 7/2002 ............. G05B 11/42 |

OTHER PUBLICATIONS

Current Claims in application No. PCT/EP2014/064490, dated Jan. 2016, 5 pages.

European Patent Office, "Search Report" in application No. PCT/EP2014/064490, dated Nov. 2014, 16 pages.

European Claims in application No. PCT/EP2014/064490, dated Nov. 2014, 5 pages.

Bhattacharyya et al, "1. PID Controllers: An Overview of Classical Theory", Structure, Robustness and Optimization dated 2009, 22 pages.

\* cited by examiner

Fig. 1  *Prior Art*

DIGITAL STRESS SHARING CONTROL LOOPS FOR POINT OF LOAD CONVERTERS

RELATED APPLICATION DATA AND CLAIM OF PRIORITY

This application is a U.S. National Stage Patent Application filed under 35 U.S.C. § 371 of International Patent Appln. No. PCT/EP2014/064490 filed Jul. 7, 2014, which claims priority to British Patent Appln. No. 1312202.3 filed Jul. 8, 2013, the entire contents of all of which are hereby incorporated by reference as if fully set forth herein for all purposes.

FIELD OF APPLICATION

The present application relates to power converters, particularly switch mode power converters sharing a load.

DESCRIPTION

Switch Mode Power converters (SMPCs) are commonplace in electronic systems. As the operating current demand of modern loads increase, it becomes more and more difficult to deliver power to the load using a single point of load (POL) switch mode power converter, sometimes referred to simply as POL's or POL converters. For this reason and others including the availability of power handling components, component dimensions and reliability, it is common practice to provide the power to the circuit from a plurality of POLs having their outputs connected in parallel to provide power to a common load. Each POL is said to supply phase. The phases may be controlled by a common controller or individual controllers.

Where there is a plurality of individual POLs, it is important that the individual phases share the work of supplying currents to the load so as average out the component stresses, and thereby maximize system reliability.

To achieve this, the controllers of the individual POLs share device current information (or, more generally, stress share information) in a suitable way, typically through stress share bus. For many reasons, modern POL controllers are implemented as digital controllers, and the controllers share stress information in a value-discrete and time-discrete fashion. For a variety of reasons, a master-less combination or digital stress share (DSS) controllers is preferred over master-slave methods, as master-less schemes provide for superior system reliability.

FIG. 1 illustrates such a "master-less" stress sharing system 1. For clarity and simplicity of explanation, the system shown consists of only two POLs 2a, 2b. It should be noted however that the disclosed scheme is not restricted to two POLs but can support any number within reason of paralleled POLs.

In FIG. 1, POL$_1$ 2a and POL$_2$ 2b deliver load current io$_{total}$ to a common load 20 represented as R$_L$. In the representations, the converter 6a, 6b which operates switching elements to deliver current to the load and the associated controller 8a, 8b are shown as one. However, in practice the two are generally but not always separate. It is generally desirable that load current is delivered in a balanced fashion such that io$_1$=io$_2$ (or closest practically achievable) so that stresses are shared between the two converters.

Accordingly, in one known control arrangement, each POL employs two control loops 10, 12. The first loop is an inner high-bandwidth control loop (referred to as voltage control loop) 10a, 10b which ensures that the sensed voltage vo$_{sense}$ across R$_L$ closely matches a desired voltage set-point v$_{set}$ over a wide range of frequencies (from DC up to the bandwidth of this loop, typically many 10's of kHz).

The inner (embedded) voltage control loop in turn is steered by an outer current balancing loop 12a, 12b which uses a measurement of output current The measurement is suitably filtered by a low pass filter 14a, 14b. The outer current balancing loop incudes a digital stress share (DSS) controller 16a, 16b. Generally, the control objective of the DSS controller is to ensure that the POL device current matches the average or a quasi average of the POL current in the system. In order to achieve this goal, the system includes means to allow DSS controllers for different POL's to share their stress information.

In the exemplary arrangement shown, controllers attempt to share their stress information using an arbitration module 18a, 18b which in turn may be part of general communications module (not shown) by which the controllers communicate with other controllers and other devices. The stress information is generally the output current from the POL's but may also, for example, be temperature or a combination of temperature and current. At the same time, each controller monitors the stress share bus to determine the current maximum and minimum and from this determine an average stress value. It will be appreciated that this is a quasi average since the mean of the maximum and minimum will not necessarily equate directly to the average when there is more than two controllers. An exemplary method of performing such a stress sharing is described generally in EP2443731 and US20120163429-A1 which are owned by the assignee of the present application and the entire contents of each of which are hereby incorporated by reference.

In the disclosed method, each controller presents their stress values to a current share bus 22 and an arbitration scheme is present to allow the highest stress value and the lowest stress values to be shared between controllers and from which an average stress may be estimated at each controller. Thus in FIG. 1, a combination of current share bus 22 and arbitration blocks 18a, 18b is used to accomplish this exchange of information between DSS controllers. There are other methods which may be employed, for example, each device may share its stress value (e.g. output current) in sequence and from which each device may determine the average.

In greater detail, in the method disclosed in EP Patent Application No. 10726942.5, the POL's communicate their current information over a single wire digital stress share bus. Each time the transmission of a DSS packet starts, arbitration will commence, and only one device in a system will succeed in transmitting its current, as either a minimum current value IOmin or a maximum current value IOmax information, and will become a temporary "Transmission Master". This packet will be received by its own receiver and all receivers of other devices concurrently. The average value estimator estimates the average current in system, providing a current reference for the current share loop. Each device becomes a current source with outer current loop following the bus current reference point meanwhile keeping voltage source behaviour controlled using the inner higher BW closed voltage control loop.

Each individual DSS controller considers the POLs output current io$_{dev}$ and the average system POL current io$_{sys}$. As a result of which the DSS controller attempts to take the necessary control action such that differences between device current and average system current are removed as far as possible. This is typically performed over a wide frequency range (from DC, up to the bandwidth of the DSS control, which typically may be a few kHz).

An exemplary DSS controller is shown in FIG. 2, in which the controller is a PI controller which comprises a proportional controller and an integral controller each with a respective gain $K_p$ and $K_i$. The integral controller comprises an integrator. The outputs from the proportional and integral controllers are summed together to give a control signal $V_{adj}$ from the DSS controller. This control signal may be used to adjust the inner (voltage) control loop.

A variety of methods may be used to accomplish this control objective. One convenient method is for the DSS controller to use the control signal to adjust the voltage set-point, to the inner voltage control loop. Thus in the exemplary arrangement shown, a control output $v_{adj}$ is provided which is added to the nominal output voltage set-point target of $v_{sp}$. The effective commanded output voltage set-point for the inner voltage control loop becomes $V_{set}=v_{sp}+v_{adj}$. It will be appreciated that by appropriate adjustment of $v_{adj}$ the DSS controller can achieve balancing. It will be appreciated $V_{adj}$ may be a positive or negative value.

Master-less (also known as "democratic") current balancing is usually preferred as single-points of system failure are removed. For practical reasons, master-slave schemes have not been altogether replaced and are still being implemented.

One reason, as will be appreciated by those skilled in the art, is that it is challenging to achieve stable control system performance in such as complex system, involving embedded control loops and inter-acting POLs. Undesirable oscillatory interactions between the outer current balancing controller and inner voltage loop controllers, as well as oscillatory interactions between individual POLs need to be avoided. Prior art approaches typically avoid these instabilities by sacrificing static control system performance.

However, as a direct result this sacrificed static load regulation, the output voltage set-point has a clear and undesirable load-dependency. Today's digital loads however (e.g. memory devices for processors) expect a tightly regulated output voltage independent of output current. Hence, today's loads expect excellent load regulation.

In contrast, Master-slave stress-sharing systems can usually avoid control stability problems by preventing interactions between outer current share control, and embedded voltage loop control within slave POLs. As a result, some master-slave systems may achieve good static performance, albeit at the expense of poorer system reliability as discussed above (single-point of failure, if Master device fails).

Alternative master-less systems, with a single POL dedicated to take on the role of a voltage source (ensuring good static output voltage regulation performance) interacting with the remaining other POLs which take on the roles of current source devices again suffer from poor system stability. This stems from the fact that the voltage source POL presents its extremely low output impedance to the outputs of the current source devices. Loaded by extremely small (and complex) effective impedances, the stability margins of the current source POLs are heavily compromised.

The present application is directed at an improved arrangement.

SUMMARY

The present application offers performance and reliability benefits compared to the prior art. In the scheme presented herein, which is directed at arrangements in which a plurality of POL controllers control respective phases to provide power to a common load, each POL controller comprises a digital stress share (DSS) controller which acts as an outer control loop for an inner control loop. The present application provides for a master less arrangement in which no single controller dictates the operation of the others. The application details that the integrating aspect of a DSS controller be enabled for the majority but not for a minority (e.g. all-but-one being enabled) of the controllers. Doing so retains all benefits of a master-less stress share scheme (including absence of single point of failure) while at the same time delivering superior static stress share performance compared to prior art. Novel and economical implementation of DSS controllers are also disclosed.

Accordingly, a first aspect provides a digital controller for a point of load converter providing power to a load. The digital controller comprises a stress share control loop for equalizing the stress experienced by the point of load converter with other converters also providing power to the load, the stress share control loop providing a control signal from an error signal based on differences between received at least one stress share signal and a stress value for the converter. The stress share control loop comprises a proportional and an integral term responsive to the error signal to provide the control signal. Advantageously, the integral term may be switched between an enabled and a disabled state.

The digital controller may determine whether the integral term may be enabled or disabled at time of commissioning or at start-up. The determination may be made based on a signal received at the digital controller.

The controller may be configured to enter an arbitration process with the other controllers providing power to the load to determine whether the integral term should be enabled or disabled. Suitably, the default state is that the integral term is enabled.

The stress share signal may be received via as single wire bus.

The determination as to whether the integral term is to be enabled or disabled may be performed based on a measurement made by the digital controller of a voltage at a pin of the digital controller or of a component value connected to a pin of the digital controller.

The error signal based on differences between received at least one stress share signal and a stress value for the converter may be limited to a single bit sign value for the integral term of the stress share control loop.

In some arrangements, the at least one stress share signal received comprises a maximum stress value and a minimum stress value and in which case the error signal is based on an average of the maximum and minimum stress values. One of the maximum and minimum stress values may be provided by the digital controller.

The controller may further comprise a communications module for transmitting and receiving stress information with other controllers. The communications module may be configured to transmit and receive stress share information over a common bus.

The communications module may further comprise an arbitrator which allows the digital controller to transmit a stress value if it is the maximum or minimum stress share value experienced by controllers connected to the stress share bus. The digital controller may further comprise an output control loop for providing a output control signal to the point of load converter based on the difference between a measured output from the converter and a set point and where the set point is adjusted in response to the control signal from the stress share control loop. The control signal may be limited by a limiter so as to limit the adjustment to the set point.

The application extends to a Power Supply System comprising a plurality of POL converters as previously described, where each POL converter provides an output to a common load and each POL converter has an associated digital controller as provided by any preceding claim, wherein the integral term is enabled in a majority of controllers and disabled in a minority of controllers. The minority may be as few as a single controller.

In a second aspect, a Power Supply System is provided comprising as plurality of POL converters, each POL converter providing an output to a common load and each having an associated digital controller.

Each digital controller has a stress share control loop for equalizing the stress experienced by the associated point of load converter with the other POL converters, the stress share control loop provides a control signal from an error signal based on differences between received at least one stress share signal and a stress value for the converter, wherein the stress share control loop comprises a proportional and an integral term operating responsive to the error signal to provide the control signal; wherein the integral term is enabled in a majority of controllers and disabled in a minority of controllers.

The minority may be just a single controller.

In a further aspect, a digital controller is provided for a point of load converter, where the digital controller comprises:

a stress share control loop for equalizing the stress experienced by the point of load converter with other converters, the stress share control loop providing a control signal from an error signal based on differences between received at least one stress share signal and a stress value for the converter, the stress share control loop comprising a proportional and an integral term operating responsive to the error signal to provide the control signal; wherein the error signal based on differences between received at least one stress share signal and a stress value for the converter is limited for the integral term and not limited for the proportional term.

The error signal for the integral term may be limited to a single bit sign value. In yet another aspect, a method is provided for operating a Power Supply to power a load. The method comprises the steps of a) providing a plurality of POL converters, each POL converter providing an output to the load;

b) providing a plurality of digital controllers, each controller controlling an associated POL converter and comprising a stress share control loop for equalizing the stress experienced by the associated POL converter with the other POL converters, wherein the stress share control loop is configured to provide control signal from an error signal based on differences between received at least one stress share signal and a stress value for the convener, wherein the stress share control loop comprises a proportional and an integral term operating responsive to the error signal to provide the control signal; and c) providing a further digital controller controlling an associated POL converter, the further digital controller comprising a stress share control loop for equalizing the stress experienced by the associated POL converter with the other POL converters, wherein the stress share control loop is configured to provide a control signal from an error signal based on differences between received at least one stress share signal and a stress value for the converter, wherein the stress share control loop comprises a proportional term only.

In a further aspect, a digital controller for a point of load converter is provided.

The digital controller of this further aspect comprises:

a stress share control loop for equalizing the stress experienced by the point of load converter with other converters, the stress share control loop providing a control signal from an error signal based on differences between received at least one stress share signal and a stress value for the converter, the stress share control loop comprising an auto zero function which may be switched between an enabled and a disabled state.

DESCRIPTION OF DRAWINGS

The present application will now be described in greater detail with reference to the accompanying drawings in which.

DETAILED DESCRIPTION

Figure 1:
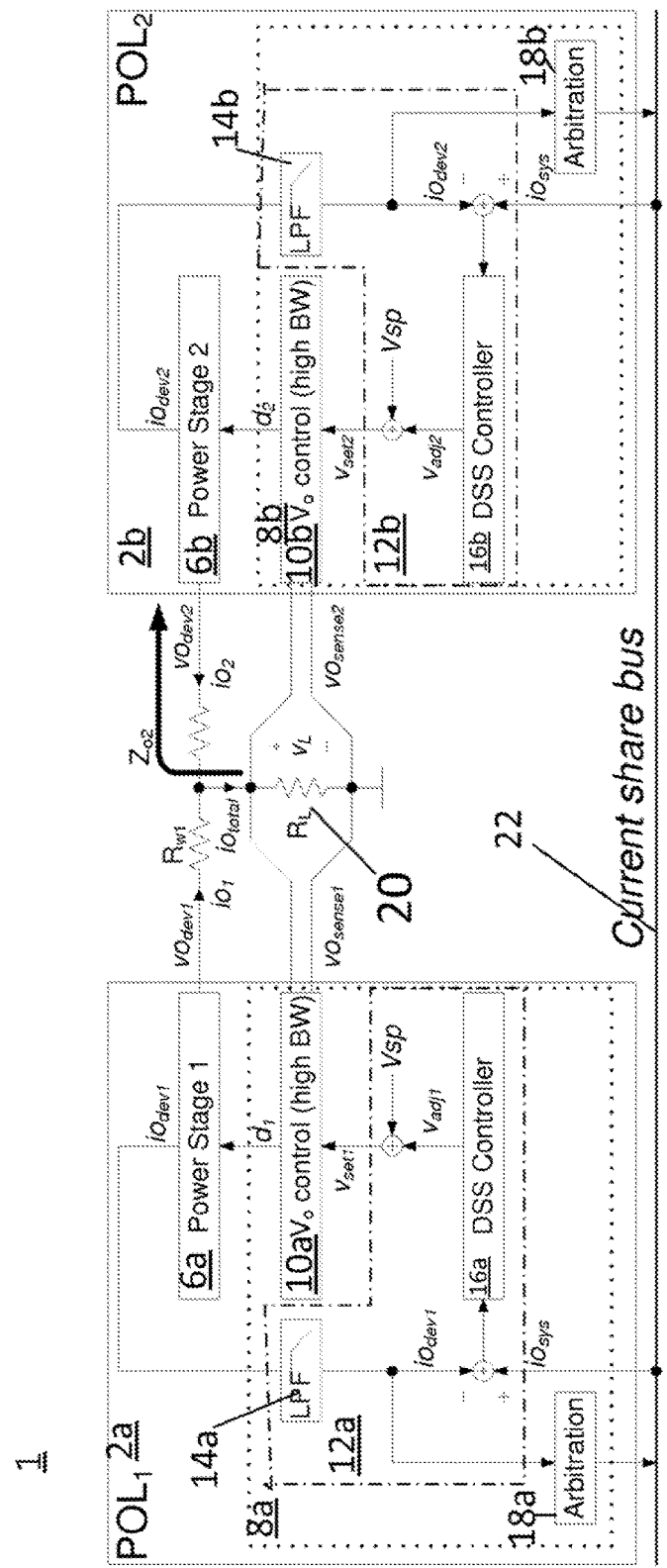
FIG. 1 illustrates the arrangement of POLs delivering balanced phase currents to a common load in a manner known in the art.

The present application provides a DSS auto zero (AZ) controller which may be employed in as master-less stress sharing system. In such a stress sharing system there are multiple POLs delivering load current to a common load in a balanced fashion. The improved Auto-Zero integrator scheme which forms part of the presented DSS AZ controller can also be employed in master-slave stress sharing systems and so is not to be construed as only having application in masterless or quasi masterless arrangements.

The present application reduces the need to sacrifice static system performance in order to achieve as stable master-less system. This is achieved through a suitable combination of DSS controllers.

More specifically and with reference to 3, the application provides for a digital controller 108a, 108b for a point of load converter 102a, 102b. The digital controller has an inner control loop which seeks to maintain the output from the point of load converter at a desired set point. Generally, the output being controlled in this fashion is a voltage. An outer control loop, which will be referred to as the stress share control loop attempts to equalize the stress experienced by an individual point of load converter with that experienced by point of load converters also providing power to the common load.

In operation, the stress share control loop provides a control signal to the inner loop. The control signal is derived from an error signal based on differences between received stress share signals ($io_{sys}$) and a measured stress value $io_{dev1}$ for the converter. The measured stress value is suitably filtered to reduce its higher frequency content, for example using a low pass filter. The stress share signal ($io_{sys}$) may be the combination of a received maximum stress value and a minimum stress value. In this arrangement, the error signal is based on an average of the maximum and minimum stress values. It will be appreciated, that for example using the arbitration scheme previously discussed above and described for example in EP Patent Application No. 10726942.5 and U.S. patent application Ser. No. 13/378,636 which are owned by the assignee of the present application and the entire contents of each of which are hereby incorporated by reference, that the maximum or minimum value may actually come from the controller itself were it experiencing the maximum or minimum stress. To allow the controller to communicate its stress values with other controllers and for providing other information to the other controllers or other devices in the circuit or external to the circuit, communications module (not shown). When stress sharing, the communications module comprises an arbitrator which allows the digital controller to transmit a stress value if it is the maximum or minimum stress share value experienced by controllers connected to the stress share bus.

This bus may be a single wire bus.

It will be equally appreciated that the present application is not limited to this particular method of stress sharing and any appropriate method may be used.

Figure 2:
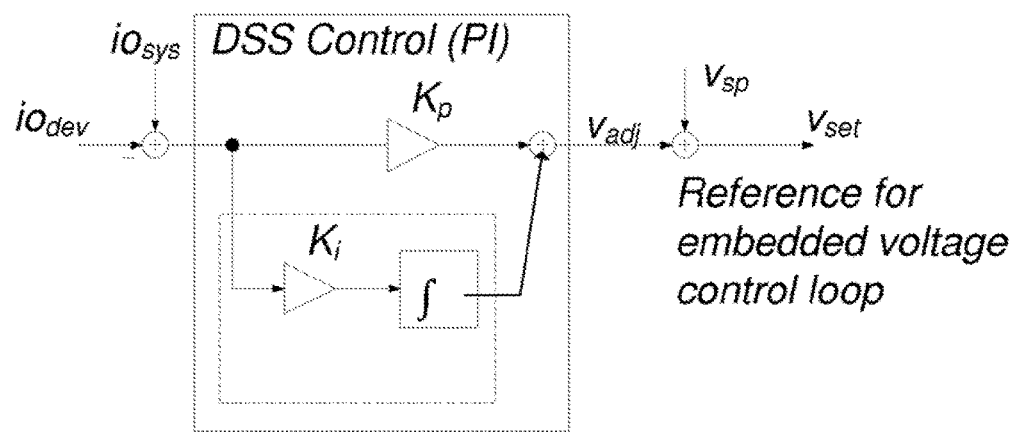
FIG. 2 illustrates a digital stress share controller suitable for use in the arrangement of FIG. 1.
Figure 4:
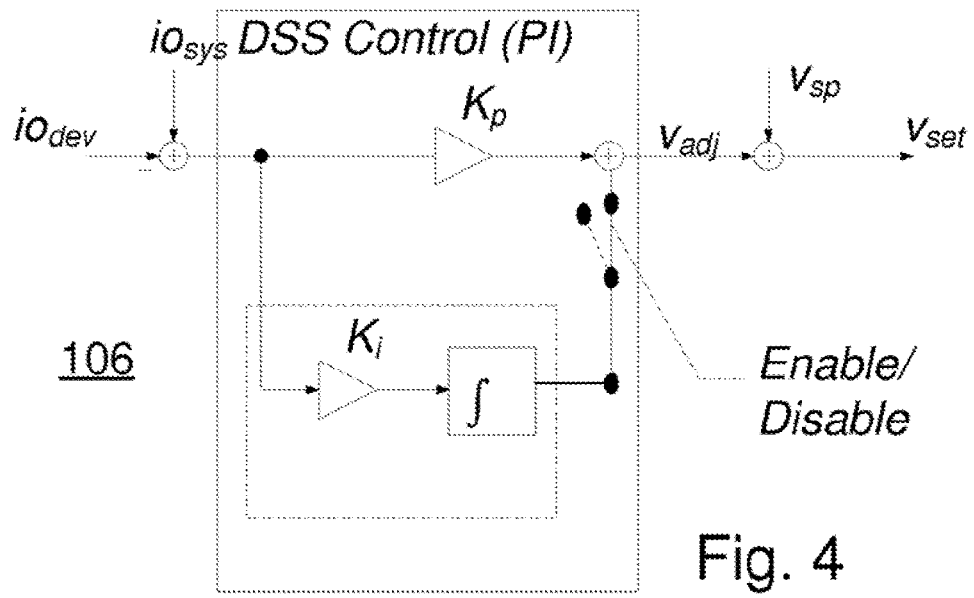
FIG. 4 illustrates a digital stress share controller suitable for use in the arrangement of FIG. 3.

An exemplary controller 108 for use as the stress share control loop 108a, 108b, as shown in FIG. 4, comprises a proportional and an integral term as previously provided for generally in the Prior Art of FIG. 2. Each of the proportional and integral terms are responsive to the error signal corresponding to the difference between received stress share signals ($io_{sys}$) and a measured stress value $io_{dev1}$ for the converter. The outputs from the proportional and integral terms are summed together to provide the control signal for the inner loop. In contrast to the arrangement of FIG. 2, the integral term may be switched between an enabled and a disabled state. This may for example be achieved by placing a switch between the output of the integral term and the summer adding its output to that of the proportional term. Equally, when implemented in a digital fashion, the switch may be effectively set in software, e.g. by multiplication by a factor with 1 enabling the output and 0 disabling it. It will be appreciated that the integral term need not be totally eliminated when disabled. For example, the overall gain of the integral term when enabled might be $K_{enabled}$ and $K_{disabled}$ and when disabled, where $K_{enabled} = xK_{disabled}$, where x is a suitable factor which significantly reduces the effect of the illegal term to the point for practical terms its effect is eliminated. In this less preferred implementation, suitably x is 10 or more and preferably greater than 20.

Figure 3:
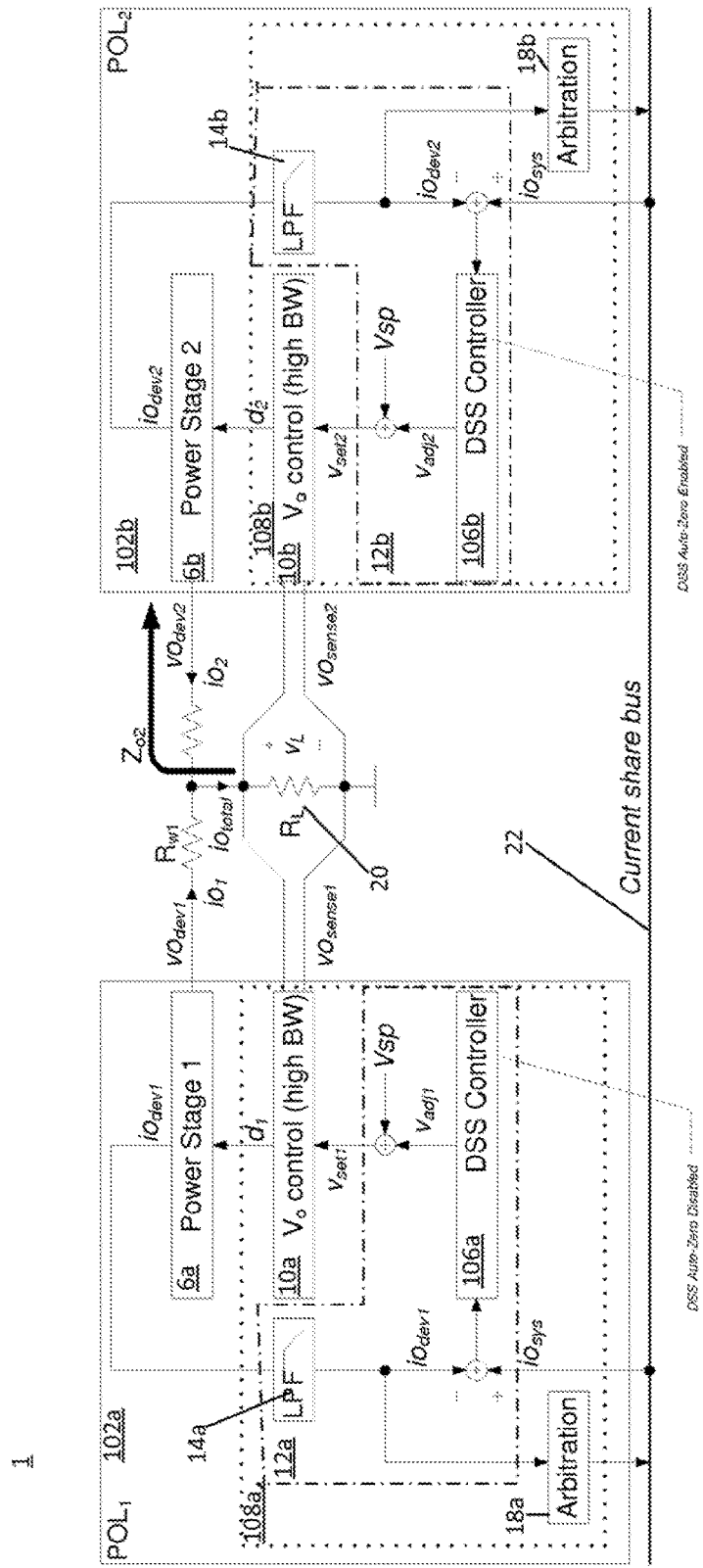
FIG. 3 illustrates an improvement as provided in the present application to the general arrangement of FIG. 1.

The use of such a controller of FIG. 4 will now be explained with reference to an exemplary arrangement as shown in FIG. 3, which operates generally in the same manner as the elements of FIG. 1 and uses corresponding reference numerals where the mode of operation is generally as previously described for FIG. 1.

The present application however provides for an improved arrangement by providing an improved stress share controllers 106a, 106b as discussed above. As discussed above, the integral property of each individual DSS controller is configured so that it may be statically enabled or disabled as required. This may be performed on the fly, at the time of commissioning the system, or on start-up. For example, a system designer might pre-select one of the controllers to have its integrator function with the DSS controller disabled and by default all others enabled. This may be implemented practically, by the system designer programming one of the controllers to be different. Similarly, the controllers may be provided with an input pin and where the digital controller may be configured to check the input pin for a voltage or the presence of a component, for example a resistance value and from this check select whether the function should be enabled or disabled. Such techniques would be familiar to those skilled in the art. This check may be performed at start-up.

Equally, whilst the individual controllers may be configured to operate in a masterless configuration, there may be a separate controller in communication with each controller for housekeeping issues rather than output control. This separate controller may determine which controller has its function enabled or disabled. Similarly, an arbitration process may be employed using the share bus or another bus to elect one of the controllers delivering power to a load to have its integrator function disabled. It will be understood, that as only one converter is generally selected to have its integral function disabled that it is easier to have the default state as enabled and disable a single converter rather than have the default state as disabled and enable all the remaining converters.

Whilst the preference is to leave the integrator function once disabled as disabled, it is not necessarily so limited.

Thus, the preference is for the majority of DSS controllers for participating POLs have their integral property enabled. In a minority of DSS controllers, the integral property is disabled. Generally, the minority comprises only one single DSS controller.

In FIG. 3, $POL_1$ has its integrator disabled, while $POL_2$ has its integrator enabled. If an additional POLs was added to this system (not shown), they would have their integrator enabled.

During static operation, the POL with integrator disabled ($POL_1$ in FIG. 3) will effectively control the output voltage set-point, ensuring best possible voltage regulation, including load regulation. Prior to reaching a steady state, the only reason for this POL's DSS controller to produce a non-zero $v_{adj}$ correction input to the inner loop would be the presence of a mismatch between device current $io_{dev}$, and average system current $io_{sys}$. If such a mismatch exists however, the other POL ($POL_2$) would also be aware of it, and will remove this mismatch in an integral fashion (since $POL_2$ has its integrator enabled). The net result is that the described system, after reaching steady state, will provide both excellent voltage regulation (ensured by $POL_1$) as well as best possible current balancing (ensured by the integrator feature of $POL_2$). Control system instabilities are effectively prevented based on the fact that $POL_1$'s output impedance is substantially higher than the output impedance of a voltage source (due to the presence of proportional element in its DSS controller).

Figure 5:
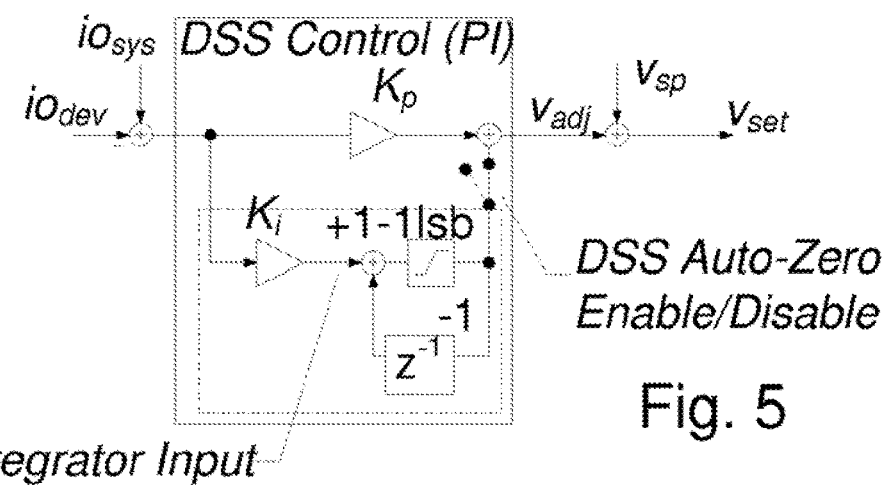
FIG. 5 illustrates an exemplary implementation for FIG. 4.

As mentioned above, at a minimum, the DSS controller consists of a parallel combination of a proportional element and an integral element. One possible implementation of such a controller is shown in FIG. 5. The output current error $io_{error} = io_{sys} - io_{dev}$ is feed into a proportional gain element $K_p$. In addition it is also feed into a first order discrete integrator. Such a discrete integrator, as an example, may be based on a prior art Infinite impulse response (IIR) structure, with integral gain element $K_i$. The integrator is of a type generally known as an Auto Zero intergrator or simply as an AZ. The outputs of the proportional element and integrator are summed to produce $v_{adj}$. In addition, the integral term may be enabled or disabled in a suitable fashion (e.g. disconnect the integrator output from the summing element as shown in FIG. 5).

Figure 6:
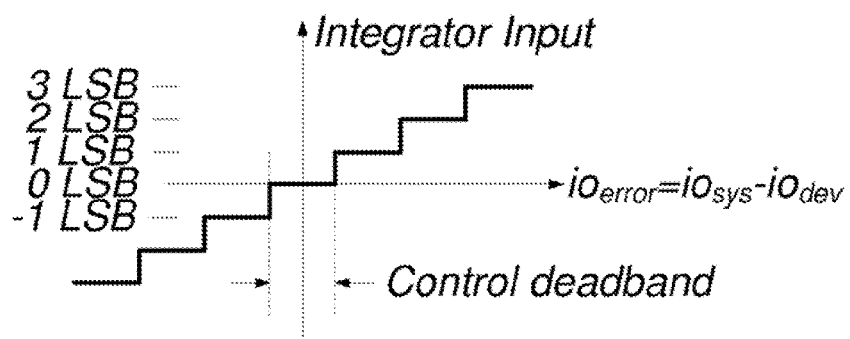
FIG. 6 illustrates a possible deadband error associated with the operation of FIG. 5.

The implementation of discrete IIR integrators as shown in FIG. 5 has a numeric disadvantage. Integrator constant $K_i$ in combination with algorithm execution frequency $f_s$ set the equivalent continuous time-domain integrator constant. In a typical application, sampling frequency $f_s$ is relatively high compared to the DSS controller's bandwidth, and, as a result, integrator constant $K_i$ will be a very small number (close to zero). Subsequently, in a practical fixed-point value-discrete implementation (e.g. Q0.15 format) the multiplication of $io_{error}$ with $K_i$ is truncated to zero for small values of $io_{error}$. As a result, a control deadband situation arises, as illustrated in FIG. 6. The x-axis represents $io_{error}$, the y-axis shows the discrete-value result the multiplication after truncation in a typical implementation, which gets fed into the discrete integrator. As shown, if the input signal is small enough to produce an output falling into the deadband, no control action is taken. This leads to the undesirable situation that current imbalances in the system with magnitudes below a certain value will not be removed due to numeric limitations of the DSS controller. The situation might be addressed by increasing the precision of the result produced by the multiplication of $io_{error}$ and $K_i$. However, this solution comes at an increased cost vis a vis implementation and latency.

Figure 7:
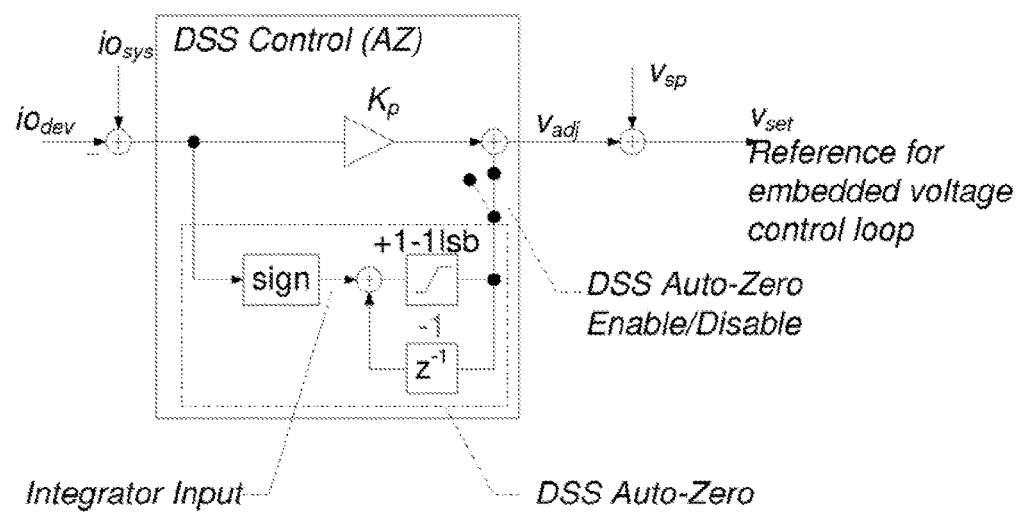
FIG. 7 is an improved implementation of FIG. 4.

An improved AZ scheme is shown in FIG. 7. In this improved scheme, the error signal based on differences between received at least one stress share signal and a stress value for the converter is limited to a single bit sign value for use as input to the integral term, i.e. the DSS Auto-Zero.

Figure 8:
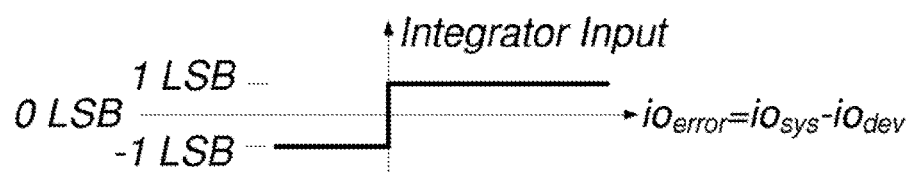
FIG. 8 illustrates the resulting improvement in deadband error using the arrangement of FIG. 7.

The improved scheme offers several advantages. For example, the cost of implementation is reduced as the $K_i$ multipliers are removed. At the same time, the truncation problems $K_i$ introduces are removed. Instead of the multiplier the introduced AZ scheme uses a sign block which just determines the sign of $io_{error}$ and encodes it as the smallest discrete quantum for a given numeric implementation (+−1 LSB). The modified mapping from signal $io_{error}$ to integrator input is shown in FIG. 8. As a result of this no deadband exists. Regardless of the input and its magnitude, the DSS controller AZ integrator is going to move each time the algorithm executes. In steady state, on average, the input to the modified AZ integrator will settle at zero. The static performance of the modified scheme is limited only by the quantization of current signals $io_{dev}$ and $io_{sys}$.

Another benefit of the disclosed AZ controller is improved stability due to its non-linear nature. Regardless of magnitude of signal $io_{error}$ the output of the integrator will move at a certain rate. The low-frequency gain of its equivalent frequency-domain transfer function is inversely proportional to input signal magnitude. This feature significantly improves stability and ensures smooth convergence towards a stable operating point until the POLs device current matches the average system device current.

As with any arrangement, it is possible for one of the controllers to fail and accordingly the system may provide for a periodic redetermination of which controller should have the AZ function disabled.

Figure 9:
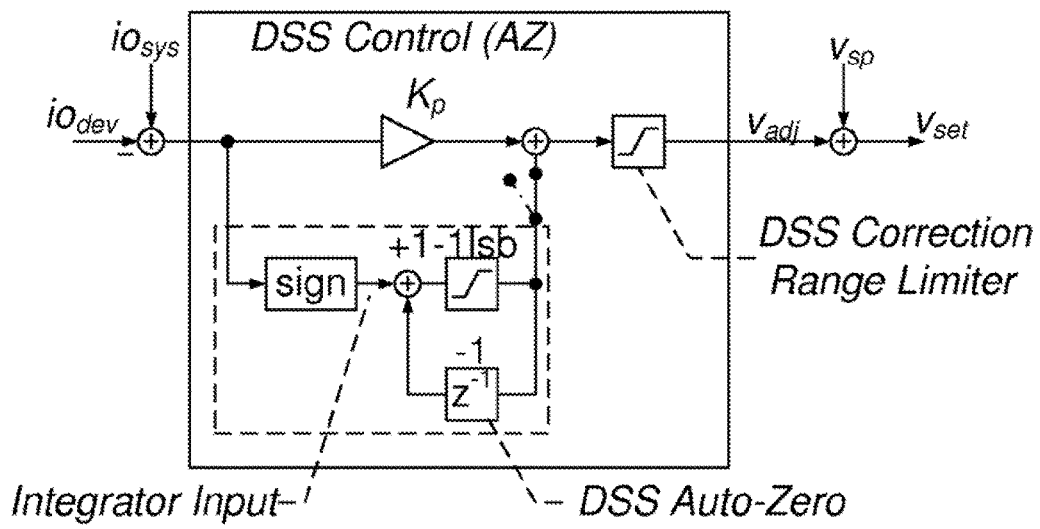
FIG. 9 illustrates as further improvement in which the output from one control loop is limited to prevent undue movement to the set paint of another control loop.

Additionally, to prevent the system entering a dangerous operating state on such an occurence, a limiting function may be imposed. An exemplary arrangement is shown in FIG. 9 in which the output from the DSS controller is limited to limit its effect upon the voltage setpoint. The limitation imposed suitably allows the voltage set point for the inner controller to operate over a limited range but protects the system from excessive output voltage deviations. The limitation imposed may be such so as to limit the variation on the setpoint voltage within 100 mV and preferably less than 30 mV. Although it will be appreciated that these may be varied based on the output voltage and the requirements of the loads in the circuit into which the POLs are being placed.

Experiments conducted using the system described herein have shown a significant improvement over prior art systems with less than 5% static current share error being observed.

It will be appreciated that the arrangements described herein renders the system masterless as the current share reference is not affected and there is no single point of failure. The system may however also be used with master-slave arrangements by appropriate modification.

It will be appreciated that whilst several different embodiments have been described herein, that the features of each may be advantageously combined together in a variety of forms to achieve advantage. Thus for example, whilst the above description has been made with reference to an exemplary controller as employed by the present assignee, it will be appreciated that the method may also be applied and\or incorporated within other adaptive control schemes. Similarly, whilst the above system and method has been described generally with respect to a switch mode power supply, it will be appreciated that the technique may also be applied to non-switching (linear) power supplies. Similarly, the different aspects of enabling\disabling the integral function, the AZ function and the limiting aspect on the adjustment to the set point may be used together or in isolation from one and other. Thus all combinations of them are to be considered described in the present application.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations and alternatives are also possible. The specifications and drawings are, accordingly, to be regarded in an illustrative rather than in a restrictive sense.

In the claims, an reference signs placed between parentheses shall not be construed as limiting the claim. The word 'comprising' does not exclude the presence of other elements or steps than those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

It is to be understood that in the context of the claims which follow the features presented in any of claims 1 to 17 ma readily be combined with the other claims and accordingly the claims should be construed as including such.

The invention claimed is:

1. A digital controller for a point of load converter for use in combination with other digital controllers for other point of load converters, the digital controller comprising:
   a stress share control loop for equalizing stress experienced by the point of load converter with other point of load converters, the stress share control loop providing a control signal from an error signal based on differences between received at least one stress share signal and a stress value for the point of load converter, the stress share control loop comprising a proportional and an integral term operating responsive to the error signal to provide the control signal; wherein the integral term is switchable between an enabled state and a disabled state so that function may be disabled in the digital controller and enabled in the other digital controllers wherein the digital controller determines whether the integral term is enabled or disabled at time of commissioning or at start-up.

2. The digital controller according to claim 1, wherein the determination is made based on a signal received at the digital controller.

3. The digital controller according to claim 1, wherein the digital controller is configured to enter an arbitration process with the other digital controllers to determine whether the integral term should be enabled or disabled.

4. The digital controller according to claim 1, wherein the digital controller has a default state, wherein the default state is that the integral term is enabled.

5. The digital controller according to claim 1, wherein the at least one stress share signal is received via a single wire bus.

6. The digital controller according to claim 1, wherein the determination is made based on a measurement made by the digital controller of a voltage at a pin or component value connected to a pin of the digital controller.

7. The digital controller according to claim 1, wherein the error signal based on differences between received at least one stress share signal and a stress value for the converter is limited to a single bit sign value for the integral term of the stress share control loop.

8. The digital controller according to claim 1, wherein the at least one stress share signal received comprises a maximum stress value and a minimum stress value and where the error signal is based on an average of the maximum and minimum stress values.

9. The digital controller according to claim 8, wherein one of the maximum and minimum stress values is provided by the digital controller.

10. The digital controller according to claim 1, the digital controller comprising a communications module for transmitting and receiving stress share information with other digital controllers.

11. The digital controller according to claim 10, wherein the communications module is configured to transmit and receive the stress share information over a common bus.

12. The digital controller according to claim 11, where the communications module comprises an arbitrator which allows the digital controller to transmit a stress value if it is the maximum or minimum stress share value experienced by the other digital controllers connected to the common bus.

13. The digital controller according to claim 1, further comprising an output control loop for providing an output control signal to the point of load converter based on the difference between a measured output from the point of load converter and a set point and where the set point is adjusted in response to the control signal from the stress share control loop.

14. The digital controller according to claim 13, wherein the control signal is limited by a limiter so as to limit the adjustment to the set point.

15. A Power Supply System comprising a plurality of Point of Load (POL) converters, each POL converter providing an output to a common load and each having an associated digital controller as provided by claim 1, wherein the integral term is enabled in a majority of digital controllers and disabled in a minority of digital controllers.

16. The power supply system according to claim 15, wherein the minority is a single digital controller.

17. A digital controller for a point of load converter, the digital controller comprising:
- a stress share control loop for equalizing stress experienced by the point of load converter with other converters, the stress share control loop providing a control signal from an error signal based on differences between received at least one stress share signal and a stress value for the point of load converter,
- the stress share control loop comprising a proportional and an integral term operating responsive to the error signal to provide the control signal;
- wherein the error signal based on differences between received at least one stress share signal and a stress value for the point of load converter is limited for the integral term and not limited for the proportional term wherein the error signal for the integral term is limited to a single bit sign value.

18. A method of operating a Power Supply to power a load, the method comprising:
- a) providing, by each POL converter from a plurality of POL converters, an output to the load;
- b) controlling, by each digital controller from a plurality of digital controllers, an associated POL converter, wherein each digital controller from the plurality of digital controllers comprises a stress share control loop for equalizing stress experienced by the associated POL converter with the other POL converters, wherein the stress share control loop is configured to provide a control signal from an error signal based on differences between received at least one stress share signal and a stress value for the associated POL converter, wherein the stress share control loop comprises a proportional and an integral term operating responsive to the error signal to provide the control signal; and
- c) controlling, by a further digital controller, an associated POL converter, the further digital controller comprising a stress share control loop for equalizing the stress experienced by the associated POL converter with the other POL converters, wherein the stress share control loop of the further digital controller is configured to provide a control signal from an error signal based on differences between received at least one stress share signal and a stress value for the associated POL converter, wherein the stress share control loop of the further digital controller comprises a proportional term only.

19. A digital controller for a point of load converter, the digital controller comprising:
- an input pin; and
- a stress share control loop for equalizing stress experienced by the point of load converter with other converters, the stress share control loop providing a control signal from an error signal based on differences between received at least one stress share signal and a stress value for the point of load converter, the stress share control loop comprising an auto zero function which is configured to be in one of an enabled state and a disabled state, wherein the digital controller is configured at start-up to check the input pin for a voltage or resistance to determine whether the auto zero function is to be enabled or disabled.

20. A digital controller for a point of load converter, the digital controller comprising: a stress share control loop for equalizing stress experienced by the point of load converter with other point of load converters, the stress share control loop providing a control signal from an error signal based on differences between received at least one stress share signal and a stress value for the point of load converter, the stress share control loop comprising an auto zero function which is configured to be in one of an enabled state and a disabled state, wherein the digital controller is configured at start-up to enter an arbitration process with other digital controllers to determine whether the auto zero function is to be enabled or disabled.

* * * * *